US009373006B2

(12) United States Patent
Cho et al.

(10) Patent No.: US 9,373,006 B2
(45) Date of Patent: Jun. 21, 2016

(54) CARD PAYMENT SYSTEM

(71) Applicant: KT Corporation, Seongnam-si, Gyeonggi-do (KR)

(72) Inventors: Youngbin Cho, Seoul (KR); Sung-chul Kim, Goyang-si (KR); Youn-pil Jeung, Seongnam-si (KR)

(73) Assignee: KT Corporation, Seongnam-si (KR)

( * ) Notice: Subject to any disclaimer, the term of this patent is extended or adjusted under 35 U.S.C. 154(b) by 0 days.

(21) Appl. No.: 14/013,126

(22) Filed: Aug. 29, 2013

(65) Prior Publication Data

US 2014/0061309 A1  Mar. 6, 2014

(30) Foreign Application Priority Data

Aug. 29, 2012  (KR) .......................... 10-2012-0095208

(51) Int. Cl.
*G06K 7/06* (2006.01)
*G06K 7/00* (2006.01)
*H04M 1/21* (2006.01)

(52) U.S. Cl.
CPC .............. *G06K 7/0004* (2013.01); *H04M 1/21* (2013.01)

(58) Field of Classification Search
CPC .. G06K 7/0021; G06K 7/0026; G06K 7/0052

USPC .......................................... 235/435, 441, 449
See application file for complete search history.

(56) References Cited

U.S. PATENT DOCUMENTS

| 8,091,780 | B2* | 1/2012 | Todd et al. ..................... 235/380 |
| 8,495,424 | B1* | 7/2013 | Vannatter et al. ................ 714/25 |
| 8,872,834 | B2* | 10/2014 | Lacroix ......................... 345/520 |
| 2010/0108762 | A1* | 5/2010 | Morley, Jr. ..................... 235/449 |
| 2013/0140360 | A1* | 6/2013 | Graylin ......................... 235/380 |
| 2013/0282501 | A1* | 10/2013 | Edwards et al. ................. 705/17 |
| 2014/0001263 | A1* | 1/2014 | Babu et al. ..................... 235/440 |

FOREIGN PATENT DOCUMENTS

KR        10-0481439 B1    4/2005

* cited by examiner

*Primary Examiner* — Daniel St Cyr
(74) *Attorney, Agent, or Firm* — Brundidge & Stanger, P.C.

(57) ABSTRACT

In one example embodiment, a card payment apparatus includes a member having a magnetic strip reader configured to read account information from a magnetic strip of a first payment card and an integrated chip (IC) reader configured to read account information from an IC chip of a second payment card; a sliding face configured to allow the first payment card to slide thereon, when the magnetic strip reader reads the account information from the magnetic strip; and a card receptacle configured to receive the second payment card, when the IC reader reads the account information from the IC chip.

20 Claims, 17 Drawing Sheets

CARD PAYMENT SYSTEM

TECHNICAL FIELD

The embodiments described herein pertain generally to a card payment system.

BACKGROUND

Making electronic payments for goods and services has become increasingly convenient in many contexts. Companies and individuals routinely use credit cards to buy goods online and to remit payments to service providers.

SUMMARY

In one example embodiment, a card payment apparatus includes a member having a magnetic strip reader configured to read account information from a magnetic strip of a first payment card and an integrated chip (IC) reader configured to read account information from an IC chip of a second payment card; a sliding face configured to allow the first payment card to slide thereon, when the magnetic strip reader reads the account information from the magnetic strip; and a card receptacle configured to receive the second payment card, when the IC reader reads the account information from the IC chip.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

DETAILED DESCRIPTION

Figure 1:
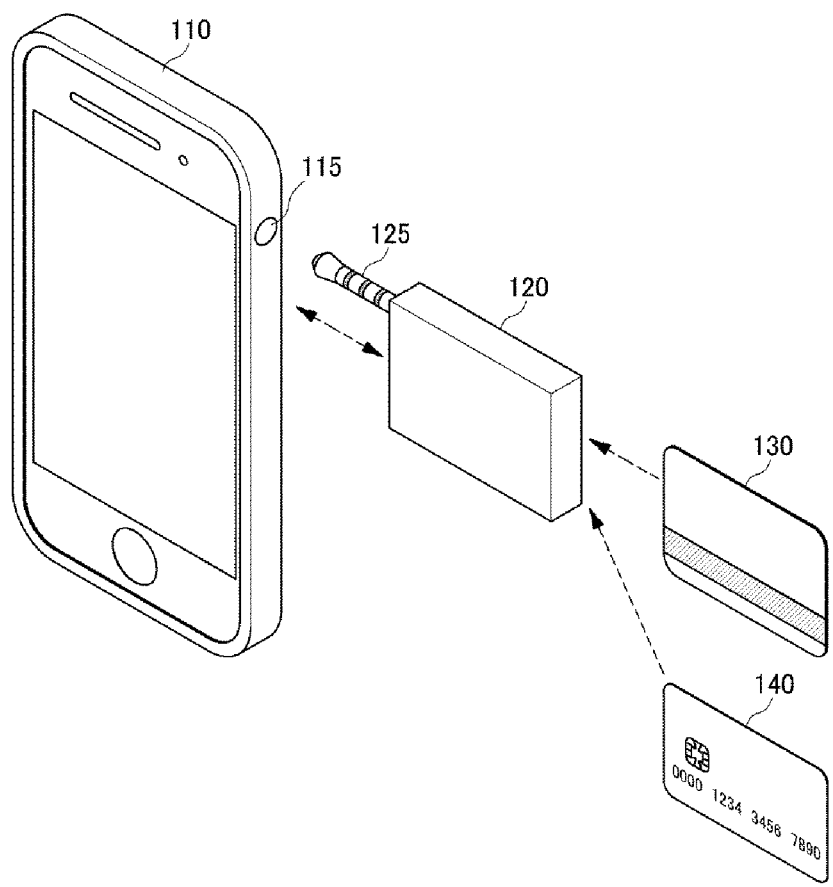
FIG. 1 shows an example system configuration in which one or more embodiments of a card payment system may be implemented.

In the following detailed description, reference is made to the accompanying drawings, which form a part of the description. In the drawings, similar symbols typically identify similar components, unless context dictates otherwise. Furthermore, unless otherwise noted, the description of each successive drawing may reference features from one or more of the previous drawings to provide clearer context and a more substantive explanation of the current example embodiment. Still, the example embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

FIG. 1 shows an example system configuration 100 in which one or more embodiments of a card payment system may be implemented. As depicted in FIG. 1, system configuration 100 includes, at least, a client device 110, and a card payment apparatus 120. Client device 110 may refer to at least one of a device that has an audio jack socket 115, such as a mobile phone, a portable device, a notebook, or even a personal computer or a personal communication terminal, such as PCS (Personal Communication System), GMS (Global System for Mobile communications), PDC (Personal Digital Cellular), PDA (Personal Digital Assistant), IMT (International Mobile Telecommunication)-2000. Client device 110 and card payment apparatus 120 may be connected when audio jack socket 115 corresponding to client device 110 receives an audio jack 125 corresponding to card payment apparatus 120.

Client device 110 may be configured to receive, from card payment apparatus 120 via audio jack 125, a first analog signal to which a first digital signal is converted. The first digital signal may include at least one of first account information, which may be read from a first payment card 130 by card payment apparatus 120, or second account information, which may be read from a second payment card 140 by card payment apparatus 120. By way of example, but not limitation, the first account information and second account information may include at least one of an account number, a card expiration date, etc. Card payment apparatus 120 may be configured to convert at least one of the read first account information or second account information into the first analog signal by using any well-known digital-analog converting scheme and to transmit the converted first analog signal to client device 110 via audio jack 125.

Client device 110 may be further configured to generate an acoustic signal. By way of example, client device 110 may generate the acoustic signal based on at least one of a waveform, a frequency, a duration, an amplitude, or a phase of an analog signal. The generated acoustic signal may be transmitted to card payment apparatus 120 via audio jack 125. Further, client device 110 may be configured to generate a second digital signal that includes a request for card payment apparatus 120 to read the first account information from first payment card 130 and/or the second account information from second payment card 140. By way of example, client device 110 may generate the second digital signal based on at least one of a frequency, a bit rate, or a bit interval of at least one of a pulse signal or a rectangular signal. Client device 110 may be further configured to convert the generated second digital signal into a second analog signal by using any well-known digital-analog converting scheme and to transmit the converted second analog signal to card payment apparatus 120 via audio jack 125.

Further, client device 110 may be configured to convert the received first analog signal into the first digital signal, which includes at least one of the first account information or second account information, by using any well-known analog-digital converting scheme. Then, client device 110 may be configured to execute a card payment based at least in part on at least one of the first account information or second account information through a card payment server (not illustrated in FIG. 1) which is communicatively coupled to client device 110 via a wireless network. The card payment server may refer to an organization or entity that provides some type of communication service, data storage service, data or information processing service, content service, or any combination thereof to business customers or consumers. The card payment server may host one or more servers or other processing apparatuses that may be configured to receive the one or more card payment execution requests from client device 110, and to provide client device 110 with the one or more expressions of at least one result of the card payment execution in response to the received card payment execution requests. Non-limiting example of the card payment server may include a financial service provider, a banking service provider, or a credit card service provider.

Client device 110 may be further configured to receive the one or more expressions of at least one result of the card payment execution from the card payment server and to display the received expressions of the card payment execution on a display or a screen that is operatively coupled thereto.

Card payment apparatus 120 may be configured to receive the acoustic signal from client device 110 via audio jack 125. Card payment apparatus 120 may be further configured to convert electrical components of the received acoustic signal into electric power by using at least one electric circuit installed in card payment apparatus 120 so that card payment apparatus 120 may operate card payment apparatus 120.

Further, card payment apparatus 120 may be configured to receive the second analog signal from client device 110 via audio jack 125. Then, card payment apparatus 120 may be configured to convert the received second analog signal into the second digital signal that includes the request to read the first account information from first payment card 130 and/or the second account information from second payment card 140 by using any well-known analog-digital converting scheme.

Card payment apparatus 120 may be further configured to read the first account information from first payment card 130 and second account information from second payment card 140. In some embodiments, card payment apparatus 120 may read at least one of the first account information or second account information in response to receipt of the second digital signal that includes the card read request. By way of example, but not limitation, card payment apparatus 120 may have at least one of a magnetic strip reader that is configured to read information from a magnetic strip of first payment card 130 or an integrated circuit chip reader that is configured to read information from an integrated circuit chip of second payment card 140.

Further, card payment apparatus 120 may be configured to convert the first digital signal, which includes the read first account information and/or second account information, into the first analog signal by using any well-known digital-analog converting scheme and to transmit the converted first analog signal to client device 110 via audio jack 125.

Thus, FIG. 1 shows an example system configuration 100 in which one or more embodiments of a card payment system may be implemented.

Figure 2:
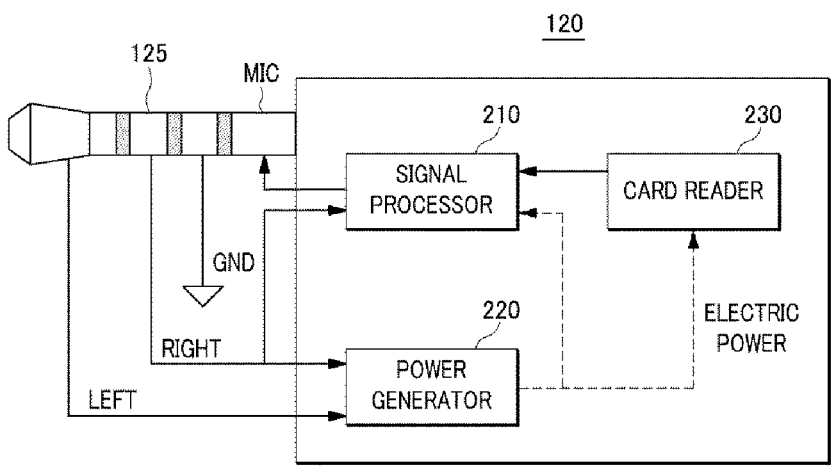
FIG. 2 shows an example configuration of a card payment apparatus by which at least portions of a card payment system may be implemented.

FIG. 2 shows an example configuration of a card payment apparatus 120 by which at least portions of a card payment system may be implemented. As depicted in FIG. 2, card payment apparatus 120, which is described above with regard to FIG. 1, may include audio jack 125, a signal processor 210, a power generator 220, and a card reader 230. Although illustrated as discrete components, various components may be divided into additional components, combined into fewer components, or eliminated altogether while being contemplated within the scope of the disclosed subject matter. Each function and/or operation of the components may be implemented, individually and/or collectively, by a wide range of hardware, software, firmware, or any combination thereof. In that regard, one or more of signal processor 210, power generator 220, and card reader 230 may be included in an instance of an application hosted by card payment apparatus 120.

In some embodiments, audio jack 125 may include at least one earphone contact, a ground contact and a microphone contact. Audio jack 125 may be inserted into audio jack socket 115 that is installed on a surface of client device 110. At least one analog signal associated with information or data may be transmitted from client device 110 to card payment apparatus 120 via the at least one earphone contact and, conversely, at least one analog signal may be transmitted from card payment apparatus 120 to client device 110 via the microphone contact.

By way of example, but not limitation, as depicted in FIG. 2, audio jack 125 may include two earphone contacts, one of which is connected to a left side earphone (i.e., left earphone contact) and the other one is connected to a right side earphone (i.e., right earphone contact).

In some embodiments, signal processor 210 may be configured to convert a first digital signal that includes at least one of first account information or second account information, which is read by card reader 230, into a first analog signal by using any well-known digital-analog converting scheme. Then, signal processor 210 may be configured to transmit the first analog signal to client device 110 via the microphone contact of audio jack 125.

In some embodiments, signal processor 210 may be configured to receive, from client device 110, an acoustic signal that includes a second analog signal via one of the two earphone contacts of audio jack 125 (e.g., right earphone contact). The second analog signal is a signal to which a second digital signal that includes a card read request is converted.

Signal processor 210 may be further configured to extract the second analog signal from the received acoustic signal and to convert the second analog signal into the second digital signal by using any well-known analog-digital converting scheme. By way of example, but not limitation, the acoustic signal may include a periodic signal portion and a non-periodic signal portion that is associated with the second digital signal. Signal processor 210 may extract the non-periodic signal portion of the acoustic signal and then, convert the non-periodic signal portion of the acoustic signal into the digital card read request.

In some embodiments, client device 110 may transmit, to card payment apparatus 120, the second analog signal separately with an acoustic signal that is used to generate electric power. Signal processor 210 may be configured to receive, from client device 110, the second analog signal via one of the two earphone contacts of audio jack 125 (e.g., right earphone contact) and to convert the received second analog signal into the second digital signal by using any well-known analog-digital converting scheme.

In some embodiments, power generator 220 may be configured to receive, from client device 110, the acoustic signal that includes the second analog signal, via at least one of the two earphone contacts of audio jack 125. Alternatively, power generator 220 may be configured to receive, from client device 110, the acoustic signal, which is not associated with digital data or information, via the other one of the two earphone contacts of audio jack 125 (e.g., left earphone contact).

Power generator 220 may be further configured to convert electrical components of the received acoustic signal into electric power to operate card payment apparatus 120. Then, power generator 220 may be configured to provide at least one of signal processor 210 or card reader 230 with the generated electric power.

Card reader 230 may be configured to read a first digital signal that includes at least one of first account information of first payment card 130 or second account information of second payment card 140. By way of example, but not limitation, the first account information and second account information may include at least one of an account number, a card expiration date, etc. In some embodiments, card reader 230 may read the first account information from a magnetic strip of first payment card 130 or read the second account information from an integrated circuit chip of second payment card 140. Card reader 230 may be further configured to transmit the first digital signal which includes the first account information and/or second account information to signal processor 210.

Thus, FIG. 2 shows an example configuration of card payment apparatus 120 by which at least portions of a card payment system may be implemented.

Figure 3:
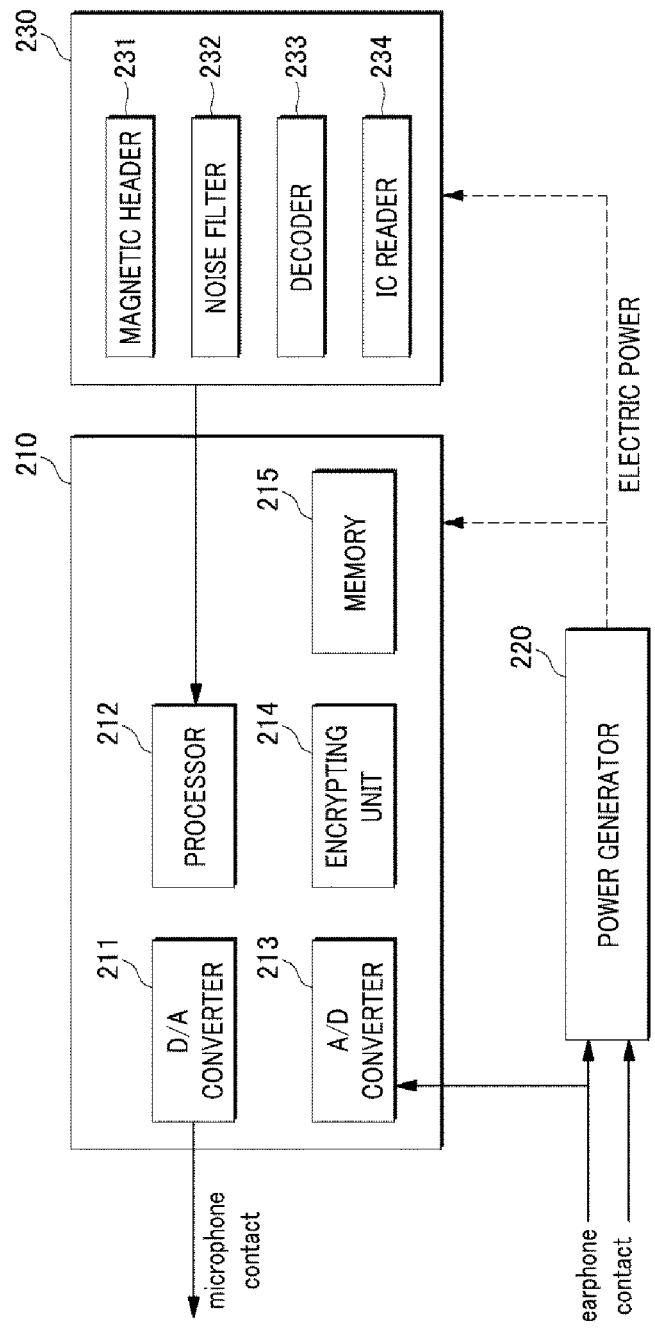
FIG. 3 shows a specific example configuration of a card payment apparatus by which at least portions of a card payment system may be implemented.

FIG. 3 shows a specific example configuration of a card payment apparatus by which at least portions of a card payment system may be implemented. As depicted in FIG. 3, signal processor 210, which is described above with regard to FIG. 2, may include a digital-analog converter 211, a processor 212, an analog-digital converter 213, an encrypting unit 214, and a memory 215. Card reader 230, which is described above with regard to FIG. 2, may include a magnetic header 231, a noise filter 232, a decoder 233, and an IC reader 234. Although illustrated as discrete components, various components may be divided into additional components, combined into fewer components, or eliminated altogether while being contemplated within the scope of the disclosed subject matter. Each function and/or operation of the components may be implemented, individually and/or collectively, by a wide range of hardware, software, firmware, or any combination thereof. In that regard, one or more of digital-analog converter 211, processor 212, analog-digital converter 213, encrypting unit 214, and memory 215 may be included in an instance of an application hosted by signal processor 210. Further, one or more of magnetic header 231, noise filter 232, decoder 233, and IC reader 234 may be included in an instance of an application hosted by card reader 230.

Digital-analog converter 211 may be configured to convert a first digital signal into a first analog signal. The first digital signal may include at least one of first account information or second account information, which is read by card reader 230, and may be encrypted by encrypting unit 214 by using any well-known encrypting scheme such as a Rivest Shamir Adleman scheme. Digital-analog converter 211 may be configured to convert the encrypted first digital signal into the first analog signal and to transmit the first analog signal to client device 110 via a microphone contact of audio jack 125.

Processor 212 may be configured to receive the first digital signal, which includes at least one of the first account information or second account information from card reader 230, and to transmit the first digital signal to encrypting unit 214. Processor 212 may be further configured to control operations of digital-analog converter 211, analog-digital converter 213, and encrypting unit 214.

Analog-digital converter 213 may be configured to receive, from client device 110, a second analog signal via at least one earphone contacts of audio jack 125. The second analog signal is a signal to which a second digital signal that includes a card read request is converted. The second digital signal may be encrypted by client device 110. Analog-digital converter 213 may be further configured to convert the second analog signal into the second digital signal by using any well-known analog-digital converting scheme and to transmit the second digital signal to encrypting unit 214.

Encrypting unit 214 may be configured to encrypt the first digital signal by using any well-known encrypting-decrypting scheme such as a Rivest Shamir Adleman scheme and to provide the encrypted first digital signal to digital-analog converter 211. Further, encrypting unit 214 may be configured to decrypt the encrypted second digital signal by using any well-known encrypting-decrypting scheme such as a Rivest Shamir Adleman scheme and to provide the second digital signal to processor 212.

Memory 215 may be configured to store at least one of the first account information, second account information, algorithms for encrypting-decrypting scheme, or predetermined instructions for operations of signal processor 210.

Power generator 220 may be configured to receive, from client device 110, an acoustic signal via at least one earphone contact of audio jack 125. Further, power generator 220 may be configured to convert electrical components of the received acoustic signal into electric power so that card payment apparatus 120 may operate card payment apparatus 120. Power generator 220 may be configured to provide signal processor 210 and card reader 230 with the electric power.

Magnetic header 231 may be configured to generate at least one periodic analog signal or non-periodic signal that has at least one waveform, at least one duration time, or at least one frequency, if first payment card 130 that includes a magnetic strip contacts with magnetic header 231 or approaches magnetic header 231.

Noise filter 232 may be configured to receive the analog signal from magnetic header 231 and to eliminate noise from the analog signal.

Decoder 233 may be configured to convert the analog signal, from which the noise is eliminated, into the first digital signal based on the at least one waveform, duration time or frequency of the analog signal. The first digital signal includes the first account information.

IC reader 234 may be configured to read the second account information from an integrated circuit chip of second payment card 140 and to transmit a first digital signal that includes the second account information to signal processor 210.

Thus, FIG. 3 shows a specific example configuration of a card payment apparatus by which at least portions of a card payment system may be implemented.

Figure 4A:
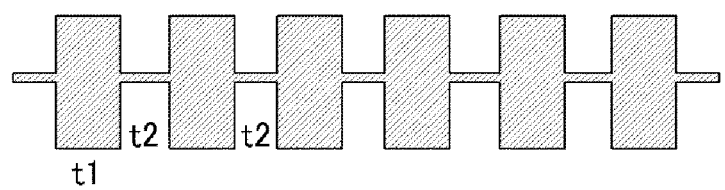
FIG. 4A shows an illustrative example of a signal generated and transmitted by a client device by which at least portions of a card payment system may be implemented.
Figure 4B:
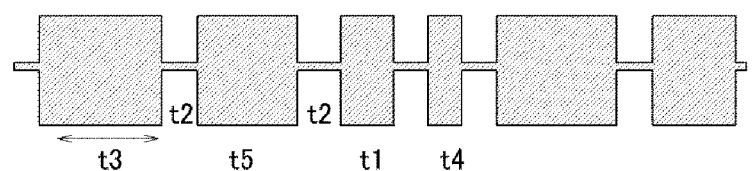
FIG. 4B shows another illustrative example of a signal generated and transmitted by a client device by which at least portions of a card payment system may be implemented.

FIG. 4A shows an illustrative example of a signal generated and transmitted by a client device 110 by which at least portions of a card payment system may be implemented and FIG. 4B shows another illustrative example of a signal generated and transmitted by a client device 110 by which at least portions of a card payment system may be implemented. As depicted in FIG. 4A, client device 110 may be configured to generate an acoustic signal that has a frequency and a regular magnitude. Client device 110 may transmit the periodic acoustic signal of FIG. 4A to card payment apparatus 120 and card payment apparatus 120 may generate electric power from the periodic acoustic signal.

As depicted in FIG. 4B, client device 110 may be configured to generate a non-periodic analog signal. By way of example, but not limitation, the non-periodic analog signal may include multiple numbers of waveforms, each of which is set to have a different duration time (e.g., t1, t3, t4, t5). Client device 110 may convert a digital signal such as a digital card read request into the non-periodic analog signal based on the each different duration time of the each of waveforms according to a predetermined algorithm. Client device 110 may transmit the non-periodic analog signal of FIG. 4B to card payment apparatus 120 and card payment apparatus 120 may convert the non-periodic analog signal into the digital card read request. Optionally, card payment apparatus 120 may also generate electric power from the non-periodic analog signal.

Thus, FIG. 4A shows an illustrative example of a signal generated and transmitted by client device 110 by which at least portions of a card payment system may be implemented and FIG. 4B shows another illustrative example of a signal generated and transmitted by client device 110 by which at least portions of a card payment system may be implemented.

Figure 5:
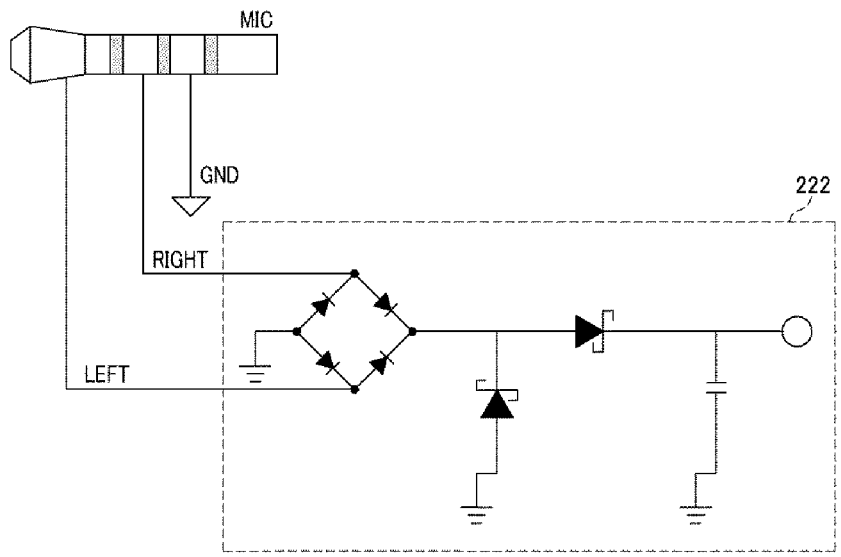
FIG. 5 shows an illustrative example of a circuit to generate electric power in an apparatus by which at least portions of a card payment system may be implemented.

FIG. 5 shows an illustrative example of a circuit to generate electric power in a card payment apparatus 120 by which at least portions of a card payment system may be implemented. In some embodiments, power generator 220 may include a circuit 222 that transforms an alternating current (AC) voltage of an acoustic signal, which is transmitted from client device 110, to a direct current (DC) voltage and boosts the direct current voltage. By way of example, but not limitation, circuit 222 may include at least one of a bridge circuit, a Schottky diode, a capacitor, or a combination thereof. The acoustic signal may be inputted to circuit 222 via at least one earphone contact (e.g., at least one left earphone contact or right earphone contact). Then, magnitudes of the voltage of the acoustic signal may be increased so that the increased voltage may be used as electric power to operate card payment apparatus 120.

Figure 6:
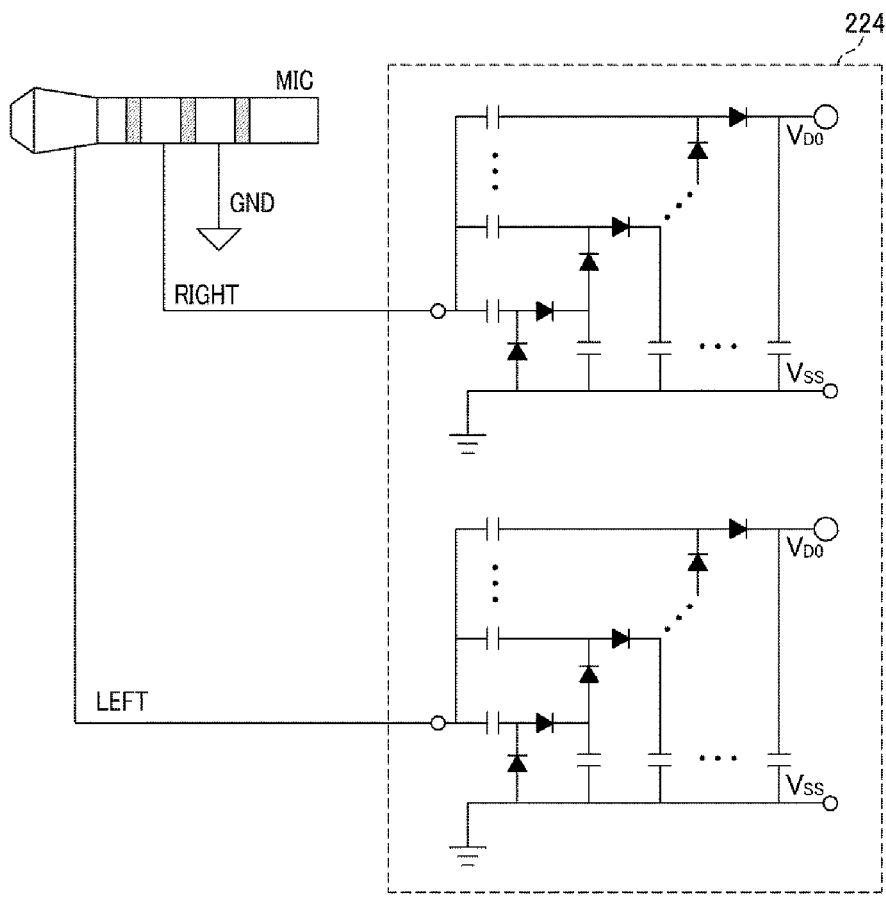
FIG. 6 shows another illustrative example of a circuit to generate electric power in an apparatus by which at least portions of a card payment system may be implemented.

FIG. 6 shows another illustrative example of a circuit to generate electric power in a card payment apparatus 120 by which at least portions of a card payment system may be implemented. In some embodiments, power generator 220 may include a circuit 224 that transforms an alternating current (AC) voltage of an acoustic signal, which is transmitted from client device 110, to a direct current (DC) voltage and boosts the direct current voltage. By way of example, but not limitation, circuit 224 may include two sub-circuits, each of which includes a multiplier circuit that includes multiple capacitors and diodes. One of the two sub-circuits may receive an acoustic signal via one earphone contact (e.g., right earphone contact) and the other of the two sub-circuits may receive an acoustic signal via the other earphone contact (e.g., left earphone contact). Then, each of the two sub-circuits may increase magnitudes of the voltage of the acoustic signals so that the increased voltage may be used as electric power to operate card payment apparatus 120.

Thus, FIG. 5 shows an illustrative example of a circuit to generate electric power in card payment apparatus 120 by which at least portions of a card payment system may be implemented and FIG. 6 shows another illustrative example of a circuit to generate electric power in card payment apparatus 120 by which at least portions of a card payment system may be implemented.

Figure 7A:
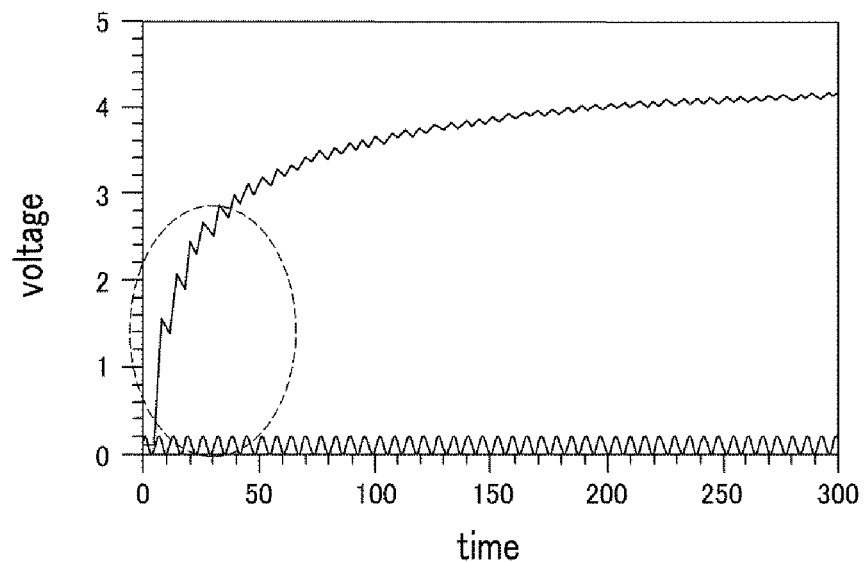
FIG. 7A shows an illustrative example of a graph of outputs from example circuits utilized to generate electric power in an apparatus by which at least portions of a card payment system may be implemented.
Figure 7B:
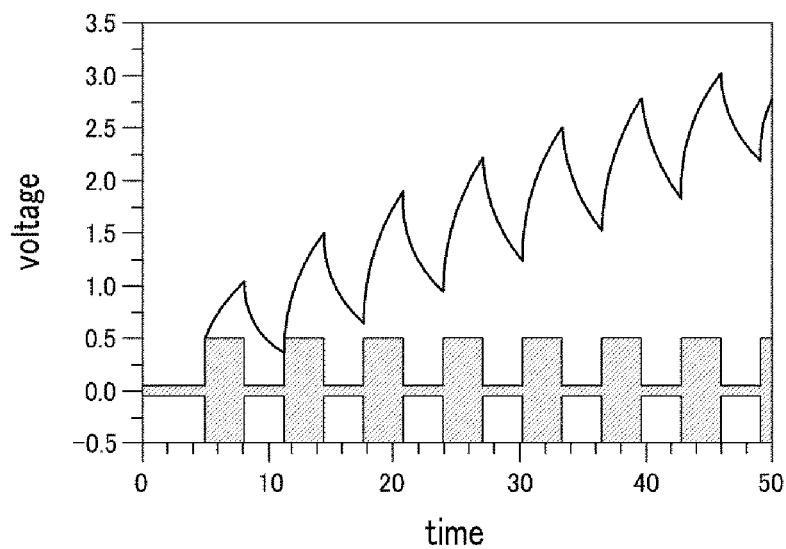
FIG. 7B shows an illustrative example of an enlarged graph of a part of the graph of FIG. 7A.

FIG. 7A shows an illustrative example of a graph of outputs from example circuits utilized to generate electric power in an apparatus by which at least portions of a card payment system may be implemented, and FIG. 7B shows an illustrative example of an enlarged graph of a part of the graph of FIG. 7A. In FIGS. 7A and 7B, an x-axis may refer to a time and a y-axis may refer to a magnitude of a voltage. In some embodiments, if an acoustic signal is inputted to circuit 222 or 224 of power generator 220, circuit 222 or 224 may be configured to transform an alternating current (AC) voltage of an acoustic signal to a direct current (DC) voltage and to increase magnitudes of the DC voltage while repeating boosting and reducing the magnitudes of the DC voltage.

Figure 8A:
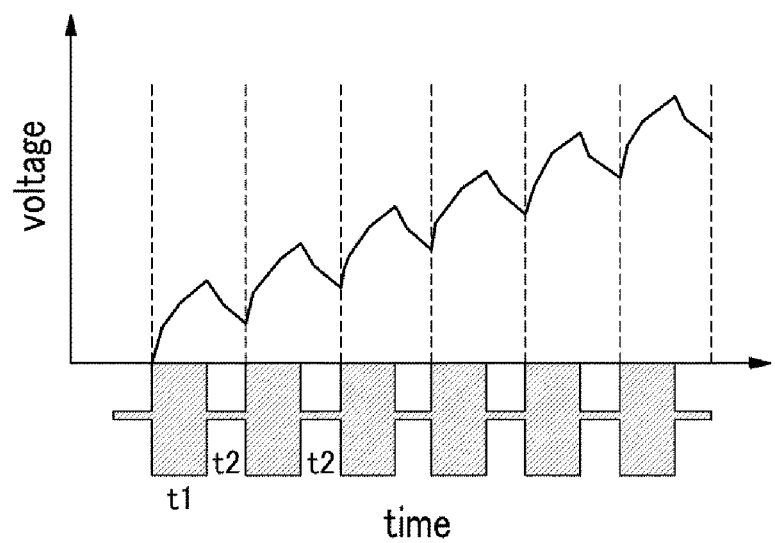
FIG. 8A shows another illustrative example of a graph of outputs from example circuits utilized to generate electric power in an apparatus by which at least portions of a card payment system may be implemented.
Figure 8B:
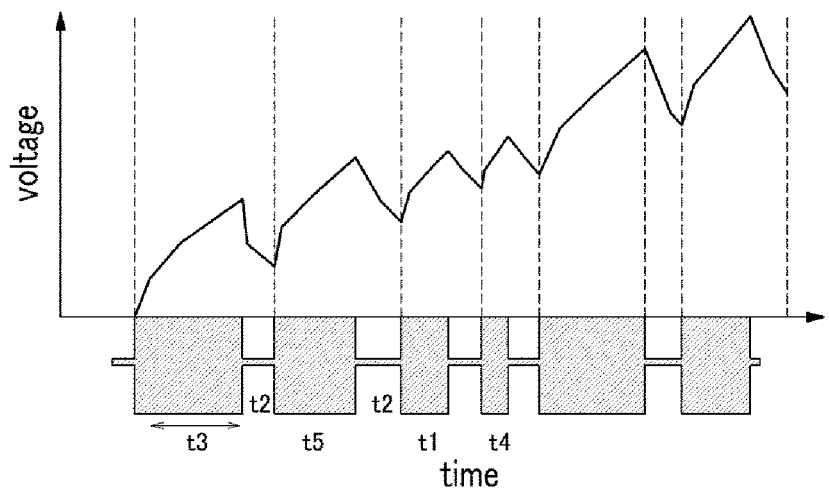
FIG. 8B shows still another illustrative example of a graph of outputs from example circuits utilized to generate electric power in an apparatus by which at least portions of a card payment system may be implemented.

FIG. 8A shows another illustrative example of a graph of outputs from example circuits utilized to generate electric power in an apparatus by which at least portions of a card payment system may be implemented, and FIG. 8B shows still another illustrative example of a graph of outputs from example circuits utilized to generate electric power in an apparatus by which at least portions of a card payment system may be implemented. In FIGS. 8A and 8B, an x-axis may refer to a time and a y-axis may refer to a magnitude of a voltage. FIG. 8A shows a graph of outputs from circuit 222 or 224 when circuit 222 or 224 receives a periodic analog signal from client device 110. Further, FIG. 8B shows a graph of outputs from circuit 222 or 224 when circuit 222 or 224 receives a non-periodic analog signal from client device 110. As depicted in FIGS. 8A and 8B, regardless of types of the analog signal, circuit 222 or 224 may be configured to transform an alternating current (AC) voltage of the periodic analog signal or the non-periodic analog signal to a direct current (DC) voltage and to increase magnitudes of the DC voltage while repeating boosting and reducing the magnitudes of the DC voltage.

As depicted in FIGS. 8A and 8B, the analog signal (i.e., acoustic signal), which is received by circuit 222 or 224, is a pulse signal that has at least one charging duration (e.g., t1, t3, t4, or t5) and at least one discharging duration (e.g., t2). Further, an absolute value of a voltage increase of the DC voltage in the at least one charging duration is greater than an absolute value of a voltage decrease of the DC voltage in the at least one discharging duration. By way of example, in case that circuit 222 or 224 receives a periodic signal as depicted in FIG. 8A, an absolute value of a voltage increase of the DC voltage in charging duration t1 is greater than an absolute value of a voltage decrease of the DC voltage in discharging duration t2. Further, in case that circuit 222 or 224 receives a non-periodic signal as depicted in FIG. 8B, an absolute value of a voltage increase of the DC voltage in charging duration t1, t3, t4 or t5 is greater than an absolute value of a voltage decrease of the DC voltage in discharging duration t2

Thus, FIG. 7A shows an illustrative example of a graph of outputs from example circuits utilized to generate electric power in an apparatus by which at least portions of a card payment system may be implemented, FIG. 7B shows an illustrative example of an enlarged graph of a part of the graph of FIG. 7A, FIG. 8A shows another illustrative example of a graph of outputs from example circuits utilized to generate electric power in an apparatus by which at least portions of a card payment system may be implemented, and FIG. 8B shows still another illustrative example of a graph of outputs from example circuits utilized to generate electric power in an apparatus by which at least portions of a card payment system may be implemented.

Figure 9:
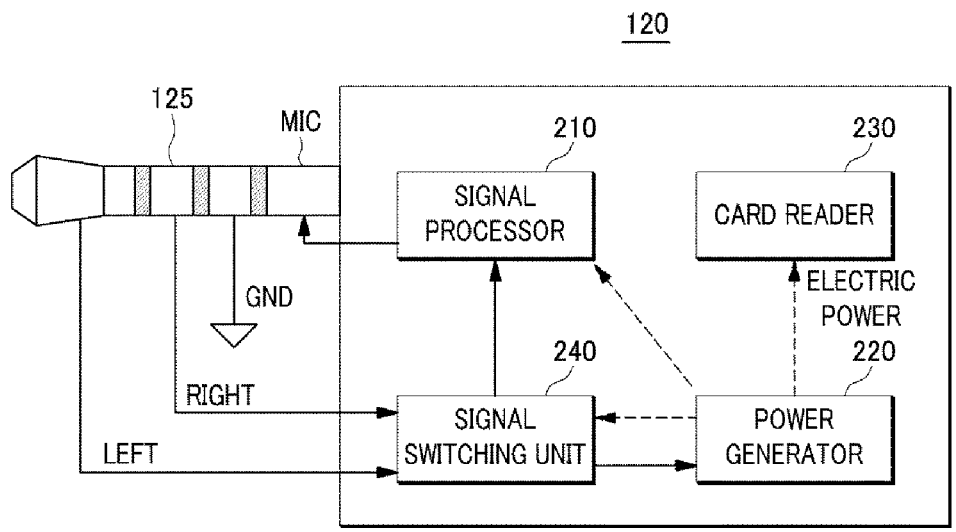
FIG. 9 shows yet another example configuration of a card payment apparatus by which at least portions of a card payment system may be implemented.

FIG. 9 shows yet another example configuration of card payment apparatus 120 by which at least portions of a card payment system may be implemented. As depicted in FIG. 9, card payment apparatus 120, which is described above with regard to FIG. 1, may include audio jack 125, a signal processor 210, a power generator 220, a card reader 230, and a signal switching unit 240. Although illustrated as discrete components, various components may be divided into additional components, combined into fewer components, or eliminated altogether while being contemplated within the scope of the disclosed subject matter. Each function and/or operation of the components may be implemented, individually and/or collectively, by a wide range of hardware, software, firmware, or any combination thereof. In that regard, one or more of signal processor 210, power generator 220, card reader 230, and signal switching unit 240 may be included in an instance of an application hosted by card payment apparatus 120.

Audio jack 125 may include at least one earphone contact, a ground contact and a microphone contact. By way of example, but not limitation, as depicted in FIG. 9, audio jack 125 may include two earphone contacts, one of which is connected to a left side earphone (i.e., left earphone contact) and the other one is connected to a right side earphone (i.e., right earphone contact).

Signal processor 210 may be configured to convert a first digital signal that includes at least one of first account information or second account information, which is read by card reader 230, into a first analog signal by using any well-known digital-analog converting scheme. Then, signal processor 210 may be configured to transmit the first analog signal to client device 110 via the microphone contact of audio jack 125.

Further, signal processor 210 may be configured to receive, from signal switching unit 240, a second analog signal to which a second digital signal that includes a card read request is converted. Further, signal processor 210 may be configured to convert the second analog signal into the second digital signal by using any well-known analog-digital converting scheme.

Power generator 220 may be configured to receive, from signal switching unit 240, an acoustic signal. Power generator 220 may be further configured to convert electrical components of the received acoustic signal into electric power to operate card payment apparatus 120. Then, power generator 220 may be configured to provide at least one of signal processor 210, card reader 230 or signal switching unit 240 with the electric power.

Card reader 230 may be configured to read the first digital signal that includes the first account information of first payment card 130 and/or the second account information of second payment card 140. By way of example, but not limitation, the first account information and second account information may include at least one of an account number, a card expiration date, etc. In some embodiments, card reader 230 may read the first account information from a magnetic strip of first payment card 130 and/or read the second account information from an integrated circuit chip of second payment card 140. Card reader 230 may be further configured to transmit the read first and/or second account information to signal processor 210.

Signal switching unit 240 may be configured to receive the acoustic signal from client device 110. In some embodiments, client device 110 may transmit, to signal switching unit 240, the acoustic signal that includes the second analog signal via at least one earphone contact of audio jack 125. Signal switching unit 240 may be configured to determine that the second analog signal is transmitted from client device 110. Signal switching unit 240 may be further configured to extract the second analog signal from the received acoustic signal and to transmit the second analog signal to signal processor 210. By way of example, but not limitation, the acoustic signal may include a periodic signal portion and a non-periodic signal portion that is associated with the second digital signal. Signal switching unit 240 may extract the non-periodic signal portion of the acoustic signal and then, transmit the non-periodic signal portion of the acoustic signal to signal processor 210 and transmit the periodic signal portion of the acoustic signal to power generator 220.

In some embodiments, client device 110 may transmit, to signal switching unit 240, the second analog signal separately with an acoustic signal that is used to generate electric power. By way of example, but not limitation, signal switching unit 240 may receive the second analog signal via the left earphone contact and receive the acoustic signal that is used to generate electric power via the right earphone contact. Then, signal switching unit 240 may be configured to transmit the second analog signal to signal processor 210 and to transmit the acoustic signal to power generator 220.

Thus, FIG. 9 shows another example configuration of card payment apparatus 120 by which at least portions of a card payment system may be implemented.

Figure 10:
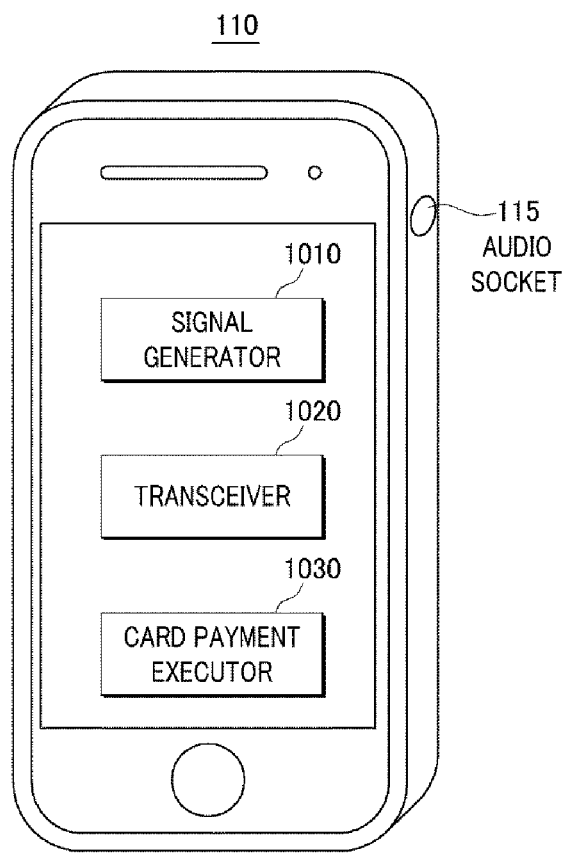
FIG. 10 shows an example configuration of a client device by which at least portions of a card payment system may be implemented.

FIG. 10 shows an example configuration of client device 110 by which at least portions of a card payment system may be implemented. As depicted in FIG. 10, client device 110, which is described above with regard to FIG. 1, may include audio jack socket 115, a signal generator 1010, a transceiver 1020, and a card payment executor 1030. Although illustrated as discrete components, various components may be divided into additional components, combined into fewer components, or eliminated altogether while being contemplated within the scope of the disclosed subject matter. Each function and/or operation of the components may be implemented, individually and/or collectively, by a wide range of hardware, software, firmware, or any combination thereof. In that regard, one or more of signal generator 1010, transceiver 1020, and card payment executor 1030 may be included in an instance of an application hosted by client device 110.

Audio jack socket 115 may be configured or shaped to receive audio jack 125 of card payment apparatus 120. By way of example, as depicted in FIG. 10, audio jack socket 115 may be installed on a surface of client device 110.

In some embodiments, signal generator 1010 may be configured to generate an acoustic signal. By way of example, but not limitation, the acoustic signal may be a periodic signal that has a frequency and a regular magnitude. Alternatively, the acoustic signal may be a non-periodic analog signal that includes multiple numbers of waveforms, each of which is set to have a different duration time.

In some other embodiments, signal generator 1010 may be configured to generate a second digital signal that includes a request for card payment apparatus 120 to read first account information from first payment card 130 and second account information from second payment card 140. Signal generator 1010 may be further configured to convert the second digital signal into a second analog signal by using any well-known digital-analog converting scheme.

In some other embodiments, signal generator 1010 may be configured to generate an acoustic signal that includes the second analog signal. By way of example, but not limitation, the acoustic signal may include a periodic signal portion and a non-periodic signal portion that is associated with the second digital signal. Signal generator 1010 may be configured to convert the second digital signal into the second analog signal (e.g., the non-periodic signal portion) based on at least one of the multiple numbers of waveforms and duration times.

Further, signal generator 1010 may be configured to encrypt the acoustic signal and second digital signal by using any well-known encrypting scheme such as a Rivest Shamir Adleman scheme.

Transceiver 1020 may be configured to receive a first analog signal from card payment apparatus 120 via a receptor for a microphone contact of audio jack 125. The first analog signal is a signal to which a first digital signal that includes at least one of the first account information or second account information is converted by card payment apparatus 120. Transceiver 1020 may be further configured to transmit the acoustic signal and second analog signal to card payment apparatus 120 via a receptor for at least one earphone contact of audio jack 125.

Card payment executor 1030 may be configured to convert the first analog signal into the first digital signal that includes at least one of the first account information or second account information by using any well-known analog-digital converting scheme. If the first digital signal is encrypted, card payment executor 1030 may be further configured to decrypt the encrypted first digital signal. Then, card payment executor 1030 may be further configured to execute a card payment based on the first account information and/or second account information between a card payment server which is communicatively coupled to client device 110.

Thus, FIG. 10 shows an example configuration of client device 110 by which at least portions of a card payment system may be implemented.

Figure 11:
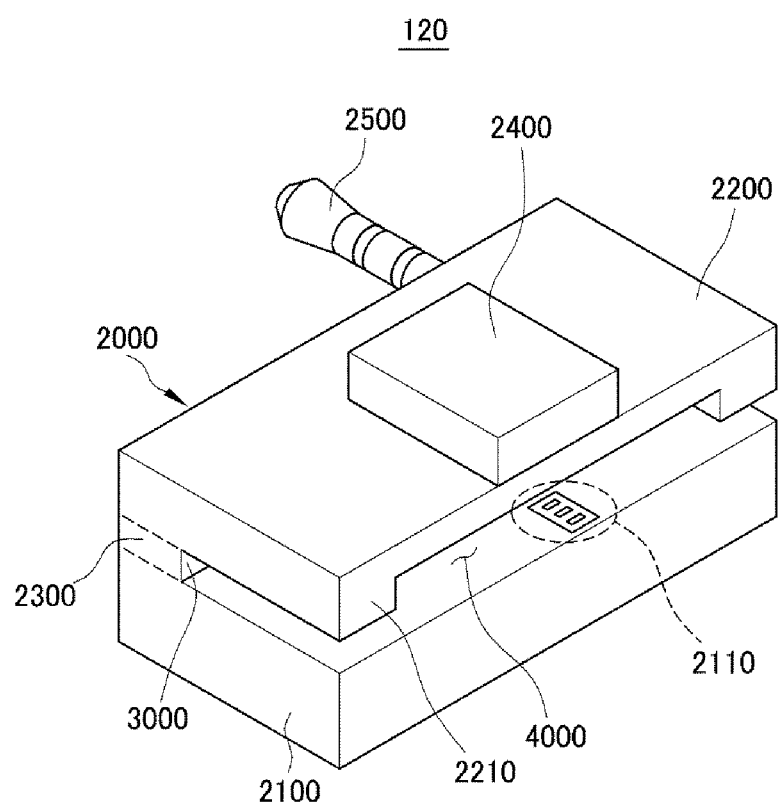
FIGS. 11 and 12 show illustrative examples of a first embodiment of a card payment apparatus by which at least portions of a card payment system may be implemented.
Figure 12:
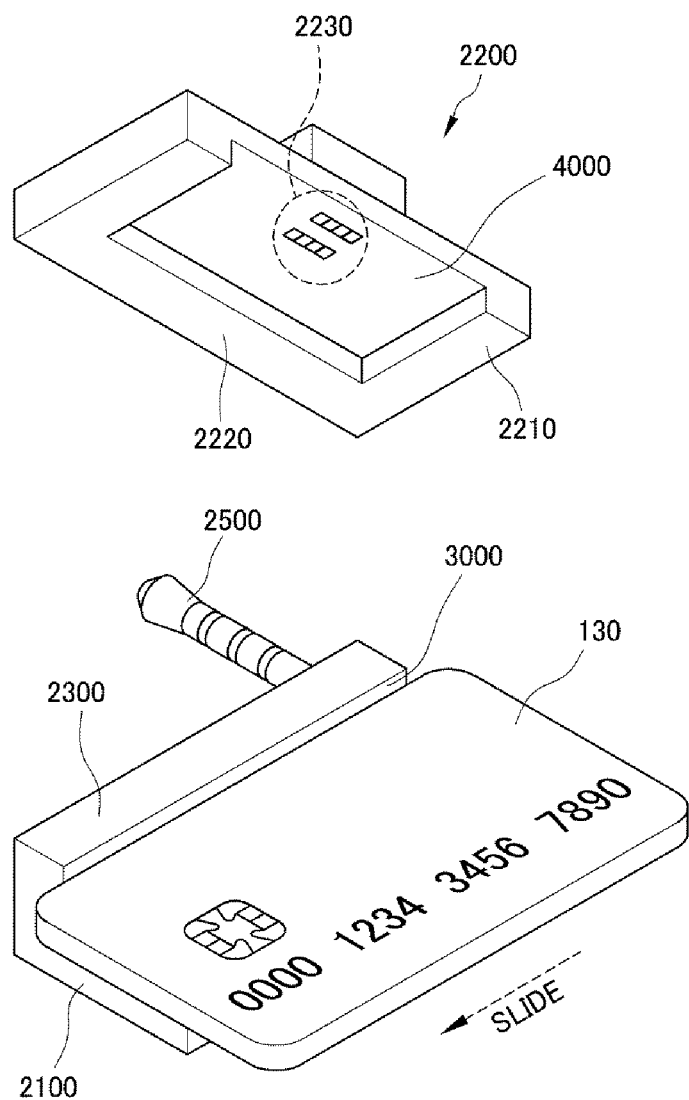

FIGS. 11 and 12 show illustrative examples of a first embodiment of a card payment apparatus by which at least portions of a card payment system may be implemented. As depicted, card payment apparatus 120 may include at least a member 2000, a sliding face 3000, a card receptacle 4000, a protrusion 2400 and an audio jack 2500.

Member 2000 may include a first portion 2100, a second portion 2200, and a third portion 2300. A top surface of first portion 2100 may be arranged to face a bottom surface of second portion 2200. Optionally, protrusion 2400 may be formed on, e.g., a top surface of second portion 2200. Further, third portion 2300 may be positioned between the top surface of first portion 2100 and bottom surface of second portion 2200.

Member 2000 may include a magnetic strip reader 2110 that may read account information from a magnetic strip of first payment card 130 and an integrated chip (IC) reader 2230 that may read account information from an IC chip of second payment card 140. By way of example, but not limitation, magnetic strip reader 2110 may be installed on or in first portion 2100 and IC reader 2230 may be installed on or in the bottom surface of second portion 2200. Alternatively, magnetic strip reader 2110 may be installed on or in second portion 2200 and IC reader 2230 may be installed on or in first portion 2100. In some examples, protrusion 2400 may accommodate at least a part of IC reader 2230. Alternatively, in case that second portion 2200 has a sufficient thickness to accommodate therein all part of IC reader 2230, protrusion 2400 may be optional or unnecessary.

In some examples, first payment card 130 may be swiped by a payer or payee to pass through card payment apparatus 120 so that magnetic strip reader 2110 may read the account information from the magnetic strip of first payment card 130. When magnetic strip reader 2110 reads the account information from the magnetic strip of first payment card 130, sliding face 3000 may allow first payment card 130 to slide thereon. By way of example, but not limitation, a side surface of third portion 2300 may function as sliding face 3000. The side surface of third portion 2300 may have a first thickness which is substantially equal to or slightly thicker than a thickness of first payment card 130. A side surface of first payment card 130 may slide along the side surface of third portion 2300 (i.e., sliding face 3000).

In some other examples, second payment card 140 may be inserted into card receptacle 4000 of card payment apparatus 120, so that IC reader 2230 may read the account information from IC chip of second payment card 140. When second payment card 140 is inserted into card receptacle 4000, IC reader 2330 and the IC chip of second payment card 140 may face each other.

By way of example, but not limitation, card receptacle 4000 may be formed in a bottom surface of second portion 2200. Card receptacle 4000 may be designed to have a depth and the depth may be substantially equal to or slightly thicker than a thickness of second payment card 140. Second portion 2200 may include two parallel parts 2210 and a connecting part 2220. Parallel parts 2210 and connecting part 2220 may be arranged to form card receptacle 4000. Two parallel parts 2210 may be arranged to face each other. By way of example, but not limitation, each of two parallel parts 2210 of second portion 2200 may be designed to have a second thickness and the second thickness may be substantially equal to or slightly thicker than a thickness of second payment card 140. Connecting part 2220 may be positioned substantially perpendicular to two parallel parts 2210. A thickness of connecting part 2220 may be substantially equal to the second thickness of two parallel parts 2210. Further, connecting part 2220 may be arranged to connect two parallel parts 2210. One end of connecting part 2220 may be fixed to one end of one parallel part 2210 and the other end of connecting part 2220 may be fixed to one end of the other parallel part 2210.

Thus, FIGS. 11 and 12 show illustrative examples of a first embodiment of card payment apparatus 120 by which at least portions of a card payment system may be implemented.

Figure 13:
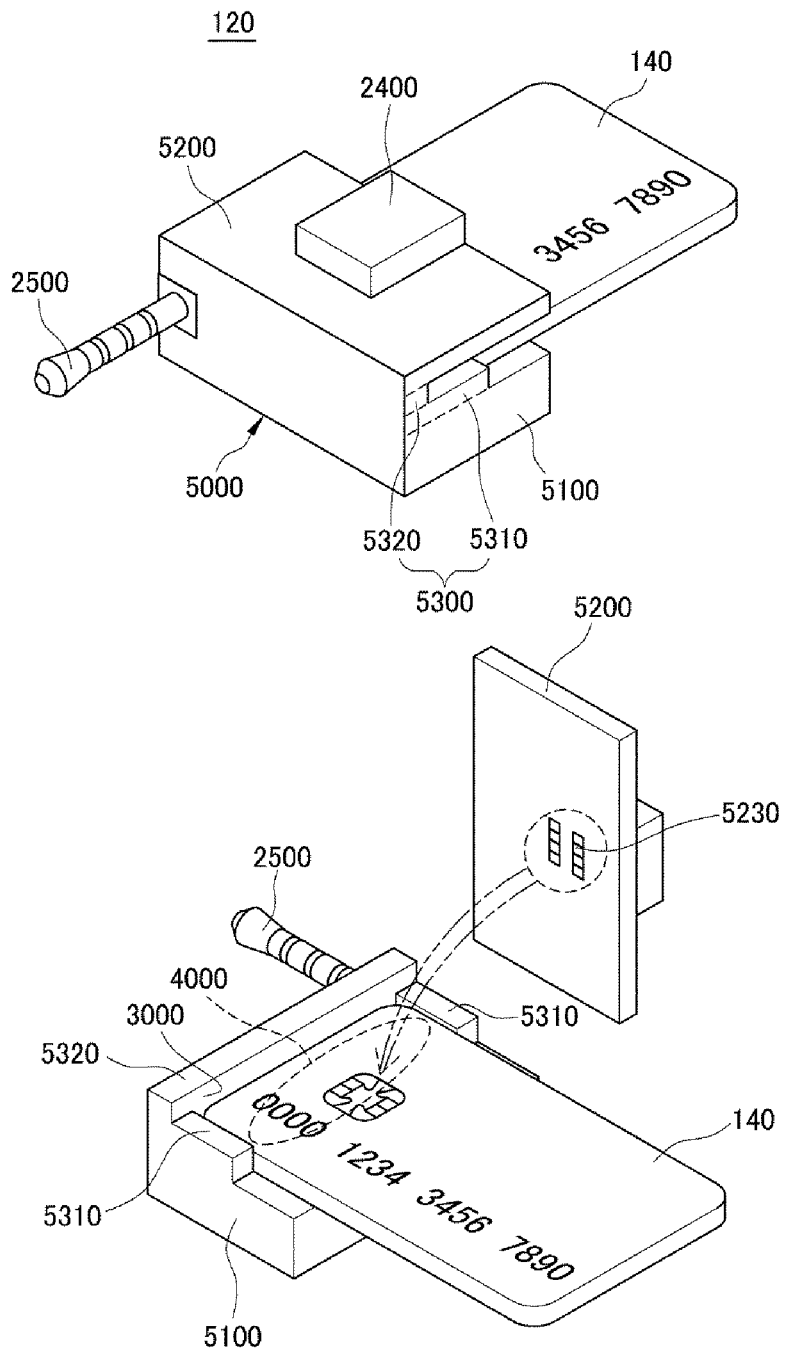
FIGS. 13 and 14 show illustrative examples of a second embodiment of a card payment apparatus by which at least portions of a card payment system may be implemented.
Figure 14:
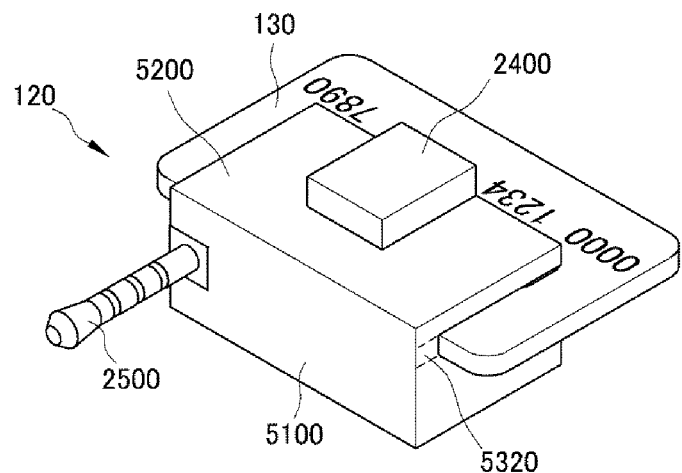
Figure 14:
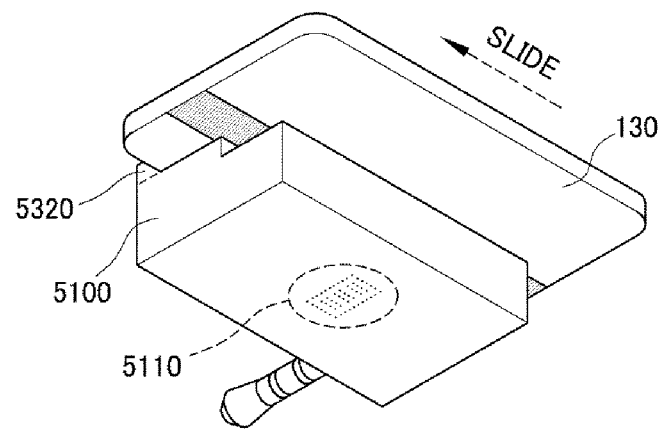
Figure 14:
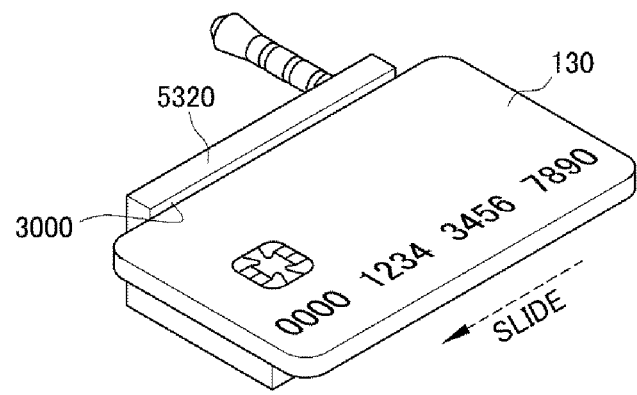

FIGS. 13 and 14 show illustrative examples of a second embodiment of a card payment apparatus by which at least portions of a card payment system may be implemented. As depicted, card payment apparatus 120 may include at least a member 5000, sliding face 3000, card receptacle 4000, protrusion 2400 and audio jack 2500.

By way of example, but not limitation, member 5000 may include a first portion 5100, a second portion 5200, and a card guide 5300. A top surface of first portion 5100 may be arranged to face a bottom surface of second portion 5200. Optionally, protrusion 2400 may be formed on, e.g., a top surface of second portion 5200. Further, card guide 5300 may be positioned between the top surface of first portion 5100 and bottom surface of second portion 5200.

Member 5000 may include a magnetic strip reader 5110 that may read account information from a magnetic strip of first payment card 130 and an integrated chip (IC) reader 5230 that may read account information from an IC chip of second payment card 140. By way of example, but not limitation, magnetic strip reader 5110 may be installed on or in first portion 5100 and IC reader 5230 may be installed on or in the bottom surface of second portion 5200. Alternatively, magnetic strip reader 5110 may be installed on or in second portion 5200 and an IC reader may be installed on or in first portion 5100. In some examples, protrusion 2400 may accommodate at least a part of IC reader 5230. Alternatively, in case that second portion 5200 has a sufficient thickness to accommodate therein all part of IC reader 5230, protrusion 2400 may be optional or unnecessary.

By way of example, but not limitation, card guide 5300 may include two parallel parts 5310 and connecting part 5320. Two parallel parts 5310 and connecting part 5320 may be arranged to form card receptacle 4000. Further, two parallel parts 5310 may be arranged to face each other. Parallel parts 5310 may be designed to have a third thickness and the third thickness may be substantially equal to or slightly thicker than a thickness of second payment card 140. Further, bottom surfaces of two parallel parts 5310 may be fixed to the top surface of first portion 5100.

Connecting part 5320 may be positioned substantially perpendicular to two parallel parts 5310. By way of example, but not limitation, connecting part 5320 may be designed to have a fourth thickness and the fourth thickness may be thicker than the third thickness of two parallel parts 5310. A thickness difference between the fourth thickness and the third thickness may be substantially equal to or slightly thicker than a thickness of first payment card 130.

Further, connecting part 5320 may be arranged to connect two parallel parts 2210. By way of example, connecting part 5320 may be arranged to connect one end of one of two parallel parts 5310 and one end of the other of two parallel parts 5310. Further, a top surface of connecting part 5320 may be fixed to the bottom surface of second portion 5200.

In some examples, first payment card 130 may be swiped by a payer or payee to pass through card payment apparatus 120, so that magnetic strip reader 5110 may read the account information from the magnetic strip of first payment card 130. When magnetic strip reader 5110 reads the account information from the magnetic strip of first payment card 130, sliding face 3000 may allow first payment card 130 to slide thereon.

By way of example, but not limitation, a side surface of connecting part 5320 may function as sliding face 3000. When first payment card 130 slides on or above the top surface of two parallel parts 5310 and a side surface of first payment card 130 slides along the side surface of connecting part 5320 (i.e., sliding face 3000), magnetic strip reader 5110 may read the account information from the magnetic strip of first payment card 130.

In some other examples, second payment card 140 may be inserted into card receptacle 4000 of card payment apparatus 120 so that IC reader 5230 may read the account information from IC chip of second payment card 140. When second payment card 140 is inserted into card receptacle 4000, IC reader 5230 and the IC chip of second payment card 140 may face each other.

Thus, FIGS. 13 and 14 show illustrative examples of a second embodiment of card payment apparatus 120 by which at least portions of a card payment system may be implemented.

Figure 15:
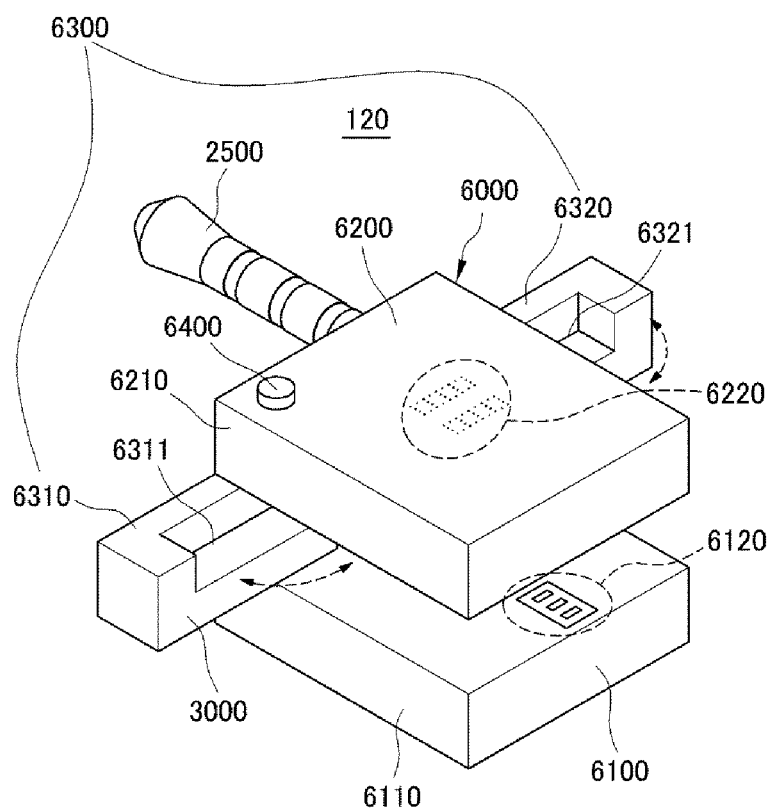
FIGS. 15 and 16 show illustrative examples of a third embodiment of a card payment apparatus by which at least portions of a card payment system may be implemented.
Figure 16:
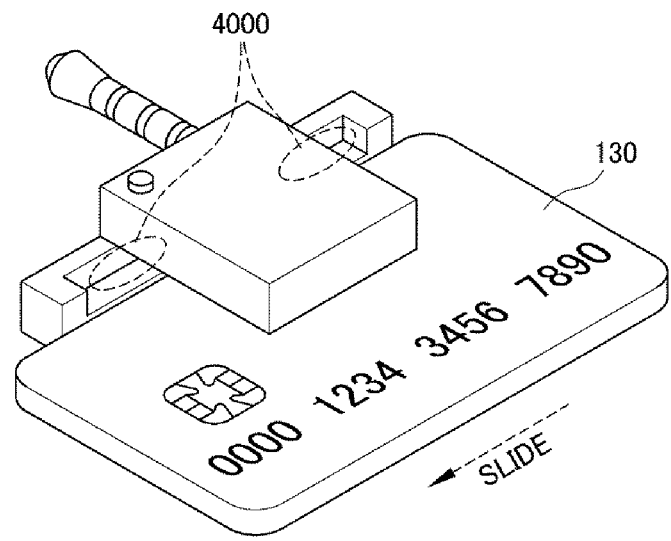
Figure 16:
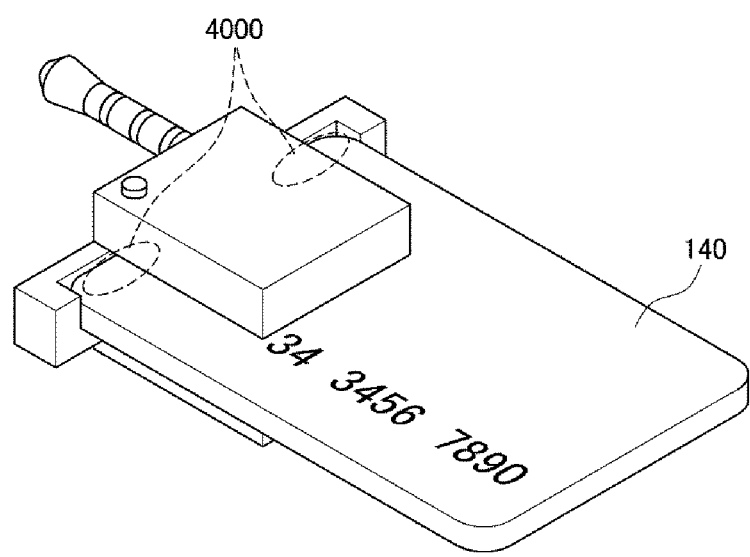

FIGS. 15 and 16 show illustrative examples of a third embodiment of a card payment apparatus by which at least portions of a card payment system may be implemented. As depicted, card payment apparatus 120 may include at least a member 6000, sliding face 3000, card receptacle 4000, a switch 6400 and audio jack 2500.

By way of example, but not limitation, member 6000 may include a first portion 6100, a second portion 6200, and a card guide 6300. A top surface of first portion 6100 may be arranged to face a bottom surface of second portion 6200. Further, card guide 6300 may be positioned between the top surface of first portion 6100 and bottom surface of second portion 6200, while connecting first portion 6100 and second portion 6200.

Member 6000 may include a magnetic strip reader 6120 that may read account information from a magnetic strip of first payment card 130 and an integrated chip (IC) reader 6220 that may read account information from an IC chip of second payment card 140. By way of example, but not limitation, magnetic strip reader 6120 may be installed on or in first portion 6100 and IC reader 6220 may be installed on or in the bottom surface of second portion 6200. Alternatively, magnetic strip reader 6120 may be installed on or in second portion 6200 and IC reader 6220 may be installed on or in first portion 6100.

Card guide 6300 may include a first part 6310 and a second part 6320. First part 6310 and second part 6320 may rotate from a first position to a second position. The "first position" may refer to a position that is substantially parallel to a side surface of member 6000 (e.g., a side surface 6110 of first portion 6100 or a side surface 6210 of second portion 6200). Further, the "second position" may refer to a position that is substantially perpendicular to the side surface of member 6000 (e.g., side surface 6110 of first portion 6100 or side surface 6210 of second portion 6200). By way of example, but not limitation, one end of first part 6310 may be joined to first portion 6100 and second portion 6200 by a hinge, which permits rotation of first part 6310. Further, one end of second part 6320 may be joined to first portion 6100 and second portion 6200 by a hinge, which permits rotation of second part 6320. When each of first part 6310 and second part 6320 are at the second position and positioned substantially collinear, first part 6310 and second part 6320 may form card receptacle 4000.

First part 6310 may include a first recess 6311. First recess 6311 may form a part of card receptacle 4000. Second part 6320 may include a second recess 6321. Second recess 6321 may form a part of card receptacle 4000. By way of example, but not limitation, respective a depth of first recess 6311 and a depth of second recess 6321 may be substantially equal to or slightly thicker than a thickness of second payment card 140.

Switch 6400 may initiate the rotations of first part 6310 and second part 6320. By way of example, when a user of card payment apparatus 120 pushes switch 6400, first part 6310 and second part 6320, which are positioned substantially parallel to side surface 6110 of first portion 6100 or side surface 6210 of second portion 6200 (i.e., positioned at the first position), start to rotate to be positioned substantially perpendicular to side surface 6110 of first portion 6100 or side surface 6210 of second portion 6200 (i.e., positioned at the second position). Further, switch 6400 may be installed on a surface of first portion 6100 or a surface of second portion 6200.

In some examples, first payment card 130 may be swiped by a payer or payee to pass through card payment apparatus 120, so that magnetic strip reader 6120 may read the account information from the magnetic strip of first payment card 130. When magnetic strip reader 6120 reads the account information from the magnetic strip of first payment card 130, sliding face 3000 may allow first payment card 130 to slide thereon. By way of example, but not limitation, sliding face 3000 may include a side surface of first part 6310 and a side surface of second part 6320. A side surface of first payment card 130 may slide along the side surfaces of first part 6310 and second part 6320 (i.e., sliding face 3000).

In some other examples, second payment card 140 may be inserted into card receptacle 4000 of card payment apparatus 120 so that IC reader 6220 may read the account information from IC chip of second payment card 140. When second payment card 140 is inserted into card receptacle 4000, IC reader 6220 and the IC chip of second payment card 140 may face each other.

Thus, FIGS. 15 and 16 show illustrative examples of a third embodiment of card payment apparatus 120 by which at least portions of a card payment system may be implemented.

Figure 17:
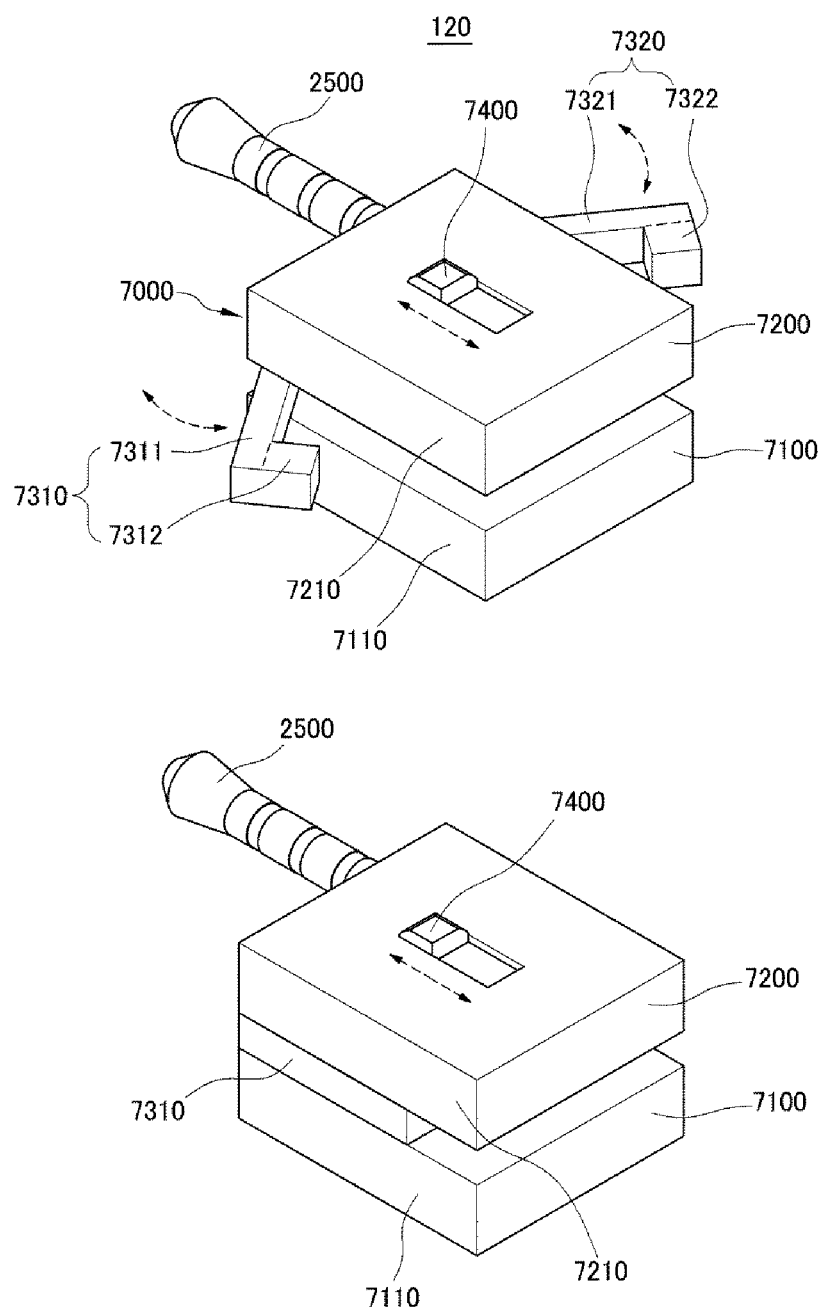
FIGS. 17 and 18 show illustrative examples of a fourth embodiment of a card payment apparatus by which at least portions of a card payment system may be implemented.
Figure 18:
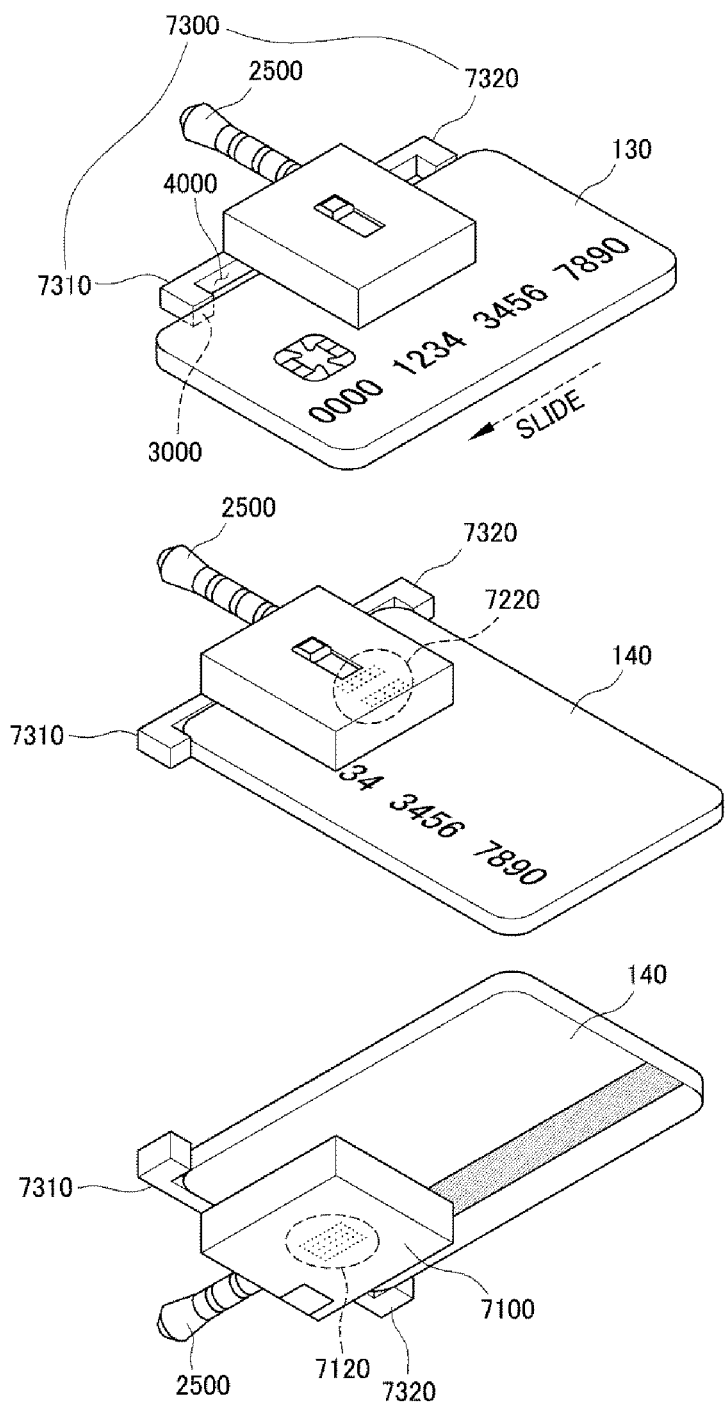

FIGS. 17 and 18 show illustrative examples of a fourth embodiment of a card payment apparatus by which at least portions of a card payment system may be implemented. As depicted, card payment apparatus 120 may be include at least a member 7000, sliding face 3000, card receptacle 4000, a switch 7400 and audio jack 2500.

By way of example, but not limitation, member 7000 may include a first portion 7100, a second portion 7200, and a card guide 7300. A top surface of first portion 7100 may be arranged to face a bottom surface of second portion 7200. Further, card guide 7300 may be positioned between the top surface of first portion 7100 and bottom surface of second portion 7200, while connecting first portion 7100 and second portion 7200.

Member 7000 may include a magnetic strip reader 7120 that may read account information from a magnetic strip of first payment card 130 and an integrated chip (IC) reader 7220 that may read account information from an IC chip of second payment card 140. By way of example, but not limitation, magnetic strip reader 7120 may be installed on or in first portion 7100 and IC reader 7220 may be installed on or in the bottom surface of second portion 7200. Alternatively, magnetic strip reader 7120 may be installed on or in second portion 7200 and IC reader 7220 may be installed on or in first portion 7100.

Card guide 7300 may include a first part 7310 and a second part 7320. First part 7310 and second part 7320 may rotate from a first position to a second position. The first position may refer to a position that is substantially parallel to a side surface of member 7000 (e.g., a side surface 7110 of first portion 7100 or a side surface 7210 of second portion 7200). Further, the second position may refer to a position that is substantially perpendicular to the side surface of member 7000 (e.g., side surface 7110 of first portion 7100 or side surface 7210 of second portion 7200). By way of example, but not limitation, one end of first part 7310 may be joined to first portion 7100 and second portion 7200 by a hinge, which permits rotation of first part 7310. Further, one end of second part 7320 may be joined to first portion 7100 and second portion 7200 by a hinge, which permits rotation of second part 7320. When each of first part 7310 and second part 7320 are at the second position and positioned substantially collinear, first part 7310 and second part 7320 may form card receptacle 4000.

First part 7310 may include a first arm 7311 and a first protrusion 7312. First protrusion 7312 may extend one end of first arm 7311 in a direction that is substantially perpendicular to first arm 7311. Second part 7320 may include a second arm 7321 and a second protrusion 7322. Second protrusion 7322 may extend one end of second arm 7321 in a direction that is substantially perpendicular to second arm 7321.

When first part 7310 and second part 7320 are at the second position, first arm 7311 and second arm 7321 may be positioned to be collinear and substantially perpendicular to respective side surface 7110, 7210 of first portion 7100 and second portion 7200. Further, when first part 7310 and second part 7320 are at the second position, first protrusion 7312 and second protrusion 7322 may be positioned to be substantially parallel to respective side surface 7110, 7210 of first portion 7100 and second portion 7200. So, first part 7310, which includes first arm 7311 and first protrusion 7312, and second part 7320, which includes second arm 7321 and second protrusion 7322, may form card receptacle 4000. Further, a thickness of each of first part 7310 or second part 7320 may be substantially equal to or slightly thicker than a thickness of first payment card 130 or second payment card 140.

In some examples, first payment card 130 may be swiped by a payer or payee to pass through card payment apparatus 120 so that magnetic strip reader 7120 may read the account information from the magnetic strip of first payment card 130. When magnetic strip reader 7120 reads the account information from the magnetic strip of first payment card 130, sliding face 3000 may allow first payment card 130 to slide thereon. By way of example, but not limitation, sliding face 3000 may include a side surface of first protrusion 7312 and a side surface of second protrusion 7322. A side surface of first payment card 130 may slide along the side surfaces of first protrusion 7312 and second protrusion 7322 (i.e., sliding face 3000).

In some other examples, second payment card 140 may be inserted into card receptacle 4000 of card payment apparatus 120, so that IC reader 7220 may read the account information from IC chip of second payment card 140. When second payment card 140 is inserted in card receptacle 4000, IC reader 7220 and the IC chip of second payment card 140 may face each other.

Switch 7400 may initiate the rotations of first part 7310 and second part 7320. By way of example, when a user of card payment apparatus 120 pushes switch 7400, first part 7310 and second part 7320, which are positioned substantially parallel to side surface 7110 of first portion 7100 or side surface 7210 of second portion 7200 (i.e., positioned at the first position), start to rotate to be positioned substantially perpendicular to side surface 7110 of first portion 7100 or side surface 7210 of second portion 7200 (i.e., positioned at the second position). Further, switch 7400 may be installed on a surface of first portion 7100 or a surface of second portion 7200.

Thus, FIGS. 17 and 18 show illustrative examples of a fourth embodiment of card payment apparatus 120 by which at least portions of a card payment system may be implemented.

Figure 19:
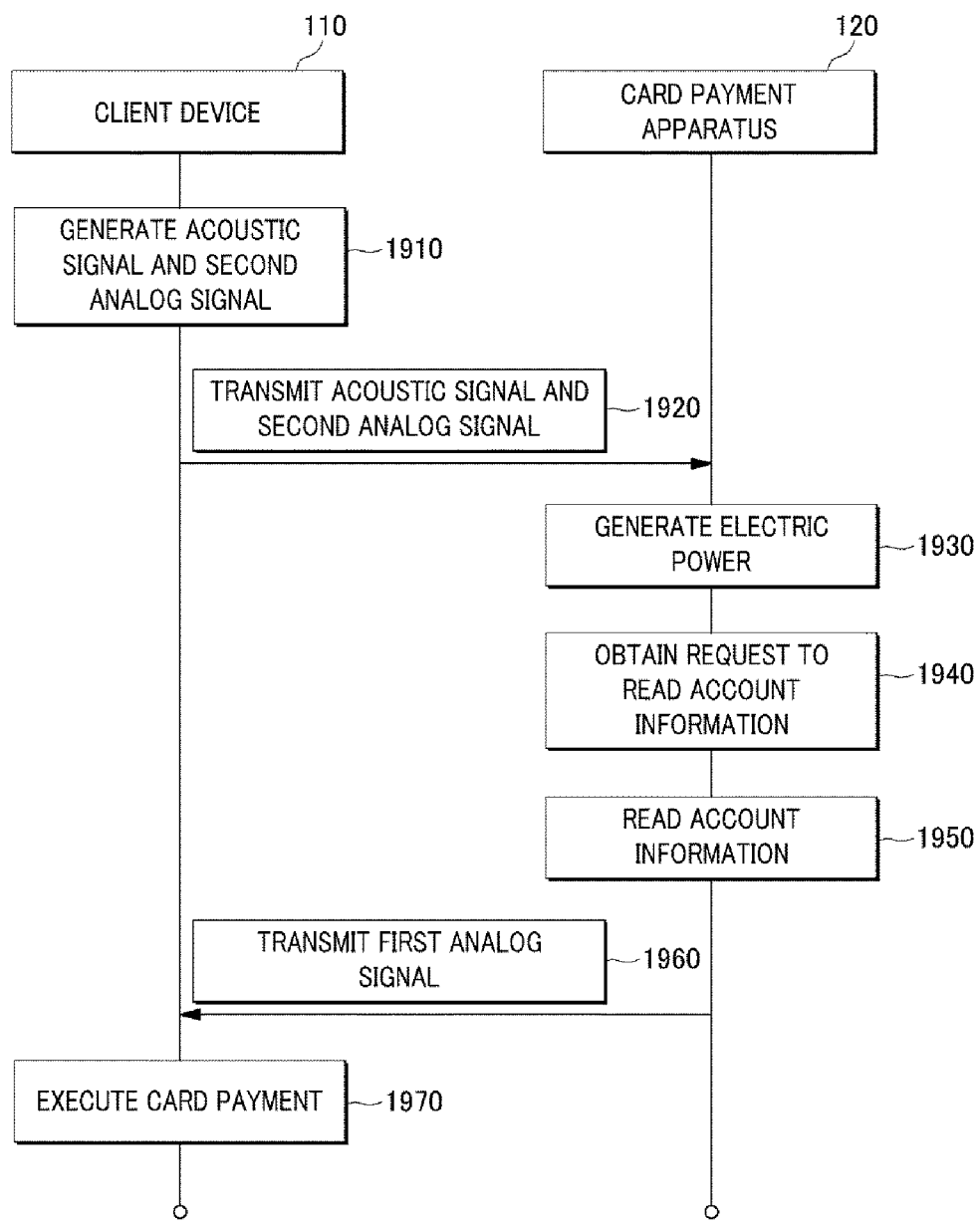
FIG. 19 shows an example processing flow of operations for implementing at least portions of a card payment system.

FIG. 19 shows an example processing flow of operations for implementing at least portions of a card payment system. The operations in FIG. 19 may be implemented in system configuration 100 including client device 110 and card payment apparatus 120, as described with reference to FIG. 1. An example process may include one or more operations, actions, or functions as illustrated by one or more blocks 1910, 1920, 1930, 1940, 1950, 1960 and/or 1970. Although illustrated as discrete blocks, various blocks may be divided into additional blocks, combined into fewer blocks, or eliminated, depending on the desired implementation. Processing may begin at block 1910.

Block 1910 (Generate Acoustic Signal and Second Analog Signal) may refer to client device 110 generating an acoustic signal and a second analog signal. By way of example, but not limitation, the acoustic signal may be a periodic signal that has a frequency and a regular magnitude. Alternatively, the acoustic signal may be a non-periodic analog signal that includes multiple numbers of waveforms, each of which is set to have a different duration time. Further, at block 1910, client device 110 may generate a second digital signal that includes a request for card payment apparatus 120 to read first account information from first payment card 130 and second account information from second payment card 140 and convert the second digital signal into a second analog signal. Processing may proceed from block 1910 to block 1920.

Block 1920 (Transmit Acoustic Signal and Second Analog Signal) may refer to client device 110 transmitting the acoustic signal and second analog signal to card payment apparatus 120. In some embodiments, client device 110 may transmit the acoustic signal that includes the second analog signal to card payment apparatus 120 via at least one earphone contact of audio jack 125 of card payment apparatus 120. In some other embodiments, client device 110 may transmit the acoustic signal to card payment apparatus 120, via one of the two earphone contacts of audio jack 125, and transmit the second analog signal separately with the acoustic signal to card payment apparatus 120 via the other one of the two earphone contacts of audio jack 125. Processing may proceed from block 1920 to block 1930.

Block 1930 (Generate Electric Power) may refer to card payment apparatus 120 generating electric power to operate card payment apparatus 120. At block 1930, card payment apparatus 120 may receive, from client device 110, the acoustic signal via at least one earphone contact of audio jack 125. Card payment apparatus 120 may convert electrical components of the received acoustic signal into electric power to operate card payment apparatus 120. Processing may proceed from block 1930 to block 1940.

Block 1940 (Obtain Request to Read Account Information) may refer to card payment apparatus 120 obtaining a request to read account information. In some embodiments, card payment apparatus 120 may convert the second analog signal to the second digital signal by using any well-known analog-digital converting scheme so that card payment apparatus 120 may obtain the request to read the first account information and/or second account information. Processing may proceed from block 1940 to block 1950.

Block 1950 (Read Account Information) may refer to card payment apparatus 120 reading the account information from payment card 130. By way of example, but not limitation, card payment apparatus 120 may read the first account information from a magnetic strip of first payment card 130 and/or the second account information from an integrated circuit chip of second payment card 140. At block 1950, card payment apparatus 120 may convert a first digital signal that includes at least one of the first account information or second account information into a first analog signal by using any well-known digital-analog converting scheme. Processing may proceed from block 1950 to block 1960.

Block 1960 (Transmit First Analog Signal) may refer to card payment apparatus 120 transmitting the first analog signal to client device 110. Card payment apparatus 120 may transmit the first analog signal to client device 110 via a microphone contact of audio jack 125 of card payment apparatus 120. Processing may proceed from block 1960 to block 1970.

Block 1970 (Execute Card Payment) may refer to client device 110 executing card payment. Client device 110 may convert the first analog signal into the first digital signal that includes at least one of the first account information or second account information by using any well-known analog-digital converting scheme. Then, client device 110 may execute a card payment based on the first and/or second account information between a card payment server which is communicatively coupled to client device 110.

Thus, FIG. 19 shows an example processing flow of operations for implementing at least portions of a card payment system.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 20:
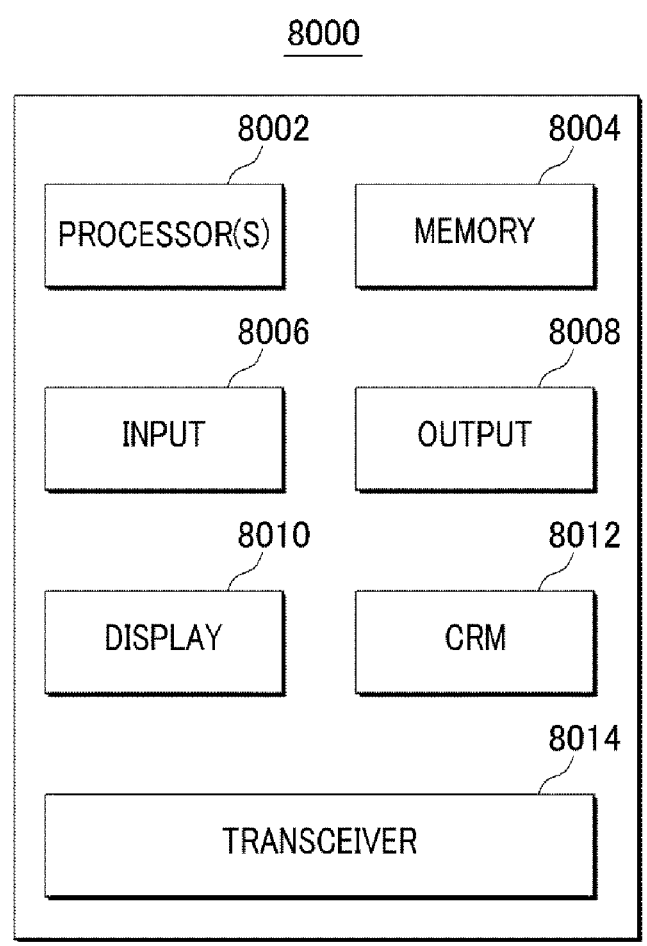
FIG. 20 shows an illustrative computing embodiment, in which any of the processes and sub-processes of a card payment system may be implemented as computer-readable instructions stored on a computer-readable medium.

FIG. 20 shows an illustrative computing embodiment, in which any of the processes and sub-processes of a card payment system may be implemented as computer-readable instructions stored on a computer-readable medium. The computer-readable instructions may, for example, be executed by a processor of a device, as referenced herein, having a network element and/or any other device corresponding thereto, particularly as applicable to the applications and/or programs described above corresponding to the configuration 100 for transactional permissions.

In a very basic configuration, a computing device 8000 may typically include, at least, one or more processors 8002, a system memory 8004, one or more input components 8006, one or more output components 8008, a display component 8010, a computer-readable medium 8012, and a transceiver 8014.

Processor 8002 may refer to, e.g., a microprocessor, a microcontroller, a digital signal processor, or any combination thereof.

Memory 8004 may refer to, e.g., a volatile memory, non-volatile memory, or any combination thereof. Memory 8004 may store, therein, an operating system, an application, and/or program data. That is, memory 8004 may store executable instructions to implement any of the functions or operations described above and, therefore, memory 8004 may be regarded as a computer-readable medium.

Input component 8006 may refer to a built-in or communicatively coupled keyboard, touch screen, or telecommunication device. Alternatively, input component 8006 may include a microphone that is configured, in cooperation with a voice-recognition program that may be stored in memory 8004, to receive voice commands from a user of computing device 8000. Further, input component 8006, if not built-in to computing device 8000, may be communicatively coupled thereto via short-range communication protocols including, but not limitation, radio frequency or Bluetooth.

Output component 8008 may refer to a component or module, built-in or removable from computing device 8000, that is configured to output commands and data to an external device.

Display component 8010 may refer to, e.g., a solid state display that may have touch input capabilities. That is, display component 8010 may include capabilities that may be shared with or replace those of input component 8006.

Computer-readable medium 8012 may refer to a separable machine readable medium that is configured to store one or more programs that embody any of the functions or operations described above. That is, computer-readable medium 8012, which may be received into or otherwise connected to a drive component of computing device 8000, may store executable instructions to implement any of the functions or operations described above. These instructions may be complimentary or otherwise independent of those stored by memory 8004.

Transceiver 8014 may refer to a network communication link for computing device 8000, configured as a wired network or direct-wired connection. Alternatively, transceiver 8014 may be configured as a wireless connection, e.g., radio frequency (RE), infrared, Bluetooth, and other wireless protocols.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

We claim:

1. A portable card payment apparatus, comprising:
    a member including:
        a first portion having a magnetic strip reader configured to read account information from a magnetic strip of a first payment card,
        a second portion having an integrated chip (IC) reader configured to read account information from an IC chip of a second payment card, and
        a card guide, positioned between the first portion and the second portion, comprising a first part and a second part, each configured to be rotatable from a first position substantially parallel to side surfaces of the member to a second position substantially perpendicular to the side surfaces of the member; and
    an opening between the first portion and the second portion, such that the magnetic strip reader and the IC reader are positioned on opposing surfaces of the opening.

2. The card payment apparatus of claim 1, wherein the member includes:
    a first portion having the magnetic strip reader;
    a second portion having the IC reader; and
    a third portion that is positioned between the first portion and the second portion, and
    wherein a side surface of the third portion functions as the sliding face and has a first thickness.

3. The portable card payment apparatus of claim 2, wherein the first thickness is slightly thicker than a thickness of the first payment card.

4. The portable card payment apparatus of claim 2, wherein the second portion includes:
    two parallel parts facing each other and having a second thickness; and
    a connecting part connecting the two parallel parts and substantially perpendicular to the two parallel parts, and
    wherein the two parallel parts and the connecting part form a card receptacle configured to receive the second payment card, when the IC reader reads the account information from the IC chip.

5. The portable card payment apparatus of claim 4, wherein the second thickness is slightly thicker than a thickness of the second payment card.

6. The portable card payment apparatus of claim 4, wherein the IC reader is installed on a bottom surface of the second portion, and
    wherein the IC reader and the IC chip of the second payment card face each other, when the second payment card is inserted in the card receptacle.

7. The portable card payment apparatus of claim 2, further comprising:
    a protrusion formed on a top surface of the second portion to accommodate therein at least a part of the IC reader.

8. The portable card payment apparatus of claim 1, further comprising:
    an audio jack having at least one earphone contact and a microphone contact; and
    a signal processor configured to:
        convert the account information into a first analog signal, and
        transmit, to a client device, the first analog signal via the microphone contact.

9. The portable card payment apparatus of claim 8, wherein the signal processor is further configured to:
    receive, via the at least one earphone contact, a second analog signal, and
    convert the second analog signal into a digital signal request to read the account information.

10. The portable card payment apparatus of claim 1, wherein the first part and the second part each has
    a third thickness, and
    a connecting part connecting the first part and the second part and substantially perpendicular to the first part and the second part and having a fourth thickness thicker than the third thickness.

11. The portable card payment apparatus of claim 10, wherein the third thickness is slightly thicker than a thickness of the second payment card, and
    wherein a thickness difference between the fourth thickness and the third thickness is slightly thicker than a thickness of the first payment card.

12. The portable card payment apparatus of claim 10, wherein a side surface of the connecting part functions as a sliding face configured to allow the first payment card to slide thereon, and
    wherein the magnetic strip reader is configured to read the account information when the magnetic strip of the first payment card slides on or above top surfaces of the two parallel parts along the side surface of the connecting part.

13. The portable card payment apparatus of claim 1,
    wherein when the first part and the second part of the card guide are at the second position, the first part and the second part of the card guide form a card receptacle configured to receive the second payment card, when the IC reader reads the account information from the IC chip.

14. The portable card payment apparatus of claim 13, wherein the first part of the card guide includes a first recess that forms a part of the card receptacle, and
wherein the second part of the card guide includes a second recess that forms the other part of the card receptacle.

15. The portable card payment apparatus of claim 14, wherein a depth of each of the first recess and the second recess is slightly thicker than a thickness of the second payment card.

16. The portable card payment apparatus of claim 13, wherein one ends of the first part and the second part are joined to the first portion and the second portion by hinges which permit rotations of the first part and the second part of the card guide.

17. The portable card payment apparatus of claim 13, further comprising:
a switch that is installed on a surface of the first portion or the second portion and configured to initiate the rotations of the first part and the second part of the card guide.

18. The portable card payment apparatus of claim 13, wherein the first part of the card guide has a first arm and a first protrusion that extends from one end of the first arm in a direction which is substantially perpendicular to the first arm,
wherein the second part of the card guide has a second arm and a second protrusion that extends from one end of the second arm in a direction which is substantially perpendicular to the second arm.

19. The portable card payment apparatus of claim 18, wherein when the first part of the card guide and the second part of the card guide are at the second position,
the first arm and the second arm are collinear and substantially perpendicular to the side surfaces of the first portion and the second portion, and
the first protrusion and the second protrusion are substantially parallel to the side surfaces of the first portion and the second portion,
wherein the sliding face includes side surfaces of the first protrusion and second protrusion.

20. The portable card payment apparatus of claim 13, wherein the IC reader is installed on a bottom surface of the second portion, and
wherein the IC reader and the integrated circuit chip of the second payment card face each other, when the second payment card is inserted in the card receptacle.

* * * * *